Sept. 6, 1932.   D. P. A. A. KAYSER   1,876,058
ELECTRIC FLASH LIGHT
Filed May 13, 1929

Inventor,
Daniel P. A. A. Kayser,
By Henry Orth
Atty.

Patented Sept. 6, 1932

1,876,058

UNITED STATES PATENT OFFICE

DANIEL PAUL ALBERT ANDRÉ KAYSER, OF PARIS, FRANCE

ELECTRIC FLASH-LIGHT

Application filed May 13, 1929, Serial No. 362,655, and in France May 26, 1928.

It is known to produce flashes of light from apparatus employing gas or acetylene or electricity. As a rule the flashing is produced either by an interrupting device which is operated by gas pressure or obtained by a motor which when electricity is used, makes contact or finally by means of a make and break or switch device which is operated by heat on the principle of expansion of metals.

The present invention relates to a device for an electric flash light in which no separate mechanism such as for instance a motor or a heat controller switch is used. On the contrary this device is based on a combination of a condenser, a resistance and a luminescence.

According to the invention, the condenser is relatively slowly charged by a current of a suitable strength and voltage, and the poles of the condenser are connected to the electrodes of a luminescence tube.

When the plates of the condenser have reached a difference of tension which corresponds to the sudden discharge in a luminescence tube, the current flows through the tube, the condenser being discharged. In order to make the flash of light thus produced, clearly perceptible, the duration of the discharge phenomenon of the condenser in the tube is lengthened by means of a resistance of a suitable valuable $+V$ which is inserted in series in the circuit which connects the condenser to the tube.

The condenser is charged again by the action of the current, and the same phenomenon begins again. According to the time which the condenser requires for becoming charged again up to the voltage which corresponds to the discharge in the luminescence tube, there will be obtained a flash light (this is the case when the time amounts for instance to a fraction of a second, in any case to 0.1 of a second) or an intermittent light (in the case in which the time normally amounts to several seconds). In a particular application of the invention there are used two condensers, each of which is connected to a source of current and two electrodes which are arranged in a luminescence tube. One of the condensers, which is of a relatively small capacity, is connected to a source of current of a relatively high voltage, so that a discharge of weak intensity is obtained which is intended to ionize the tube. This discharge enables the other condenser of large capacity which is connected to a source of strong current, to discharge transversely through the tube, an energetic lighting being produced thereby.

A construction according to the invention is diagrammatically illustrated by way of example in the accompanying drawing, in which—

Figure 1:
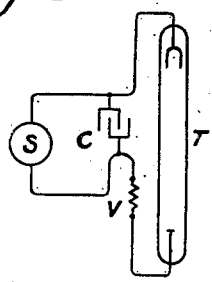
Figure 2:
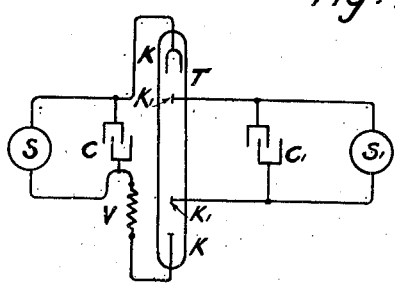
Figure 3:
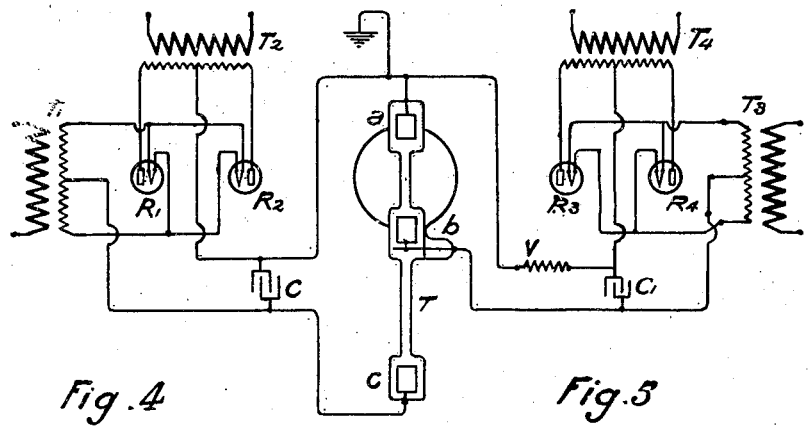
Figure 4:
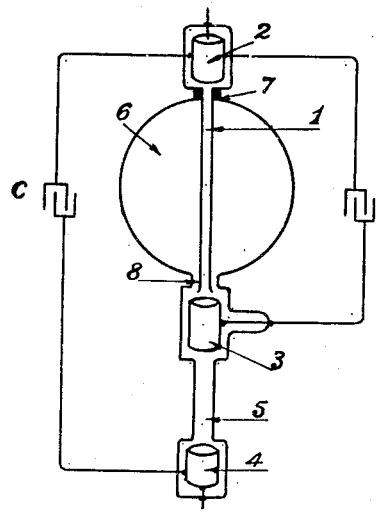

Figure 1 diagrammatically illustrates the principle of the invention,

Figure 2 shows how it may be used in combination with two condensers, one of which has a relatively small capacity and the other a relatively large capacity, Figure 3 shows by way of example a construction of the device according to Figure 2, in which a current rectifier of the known kind is used, Figure 4 shows a construction of a tube of the kind used in Figure 3 and particularly suitable for carrying out the invention.

Figure 5:
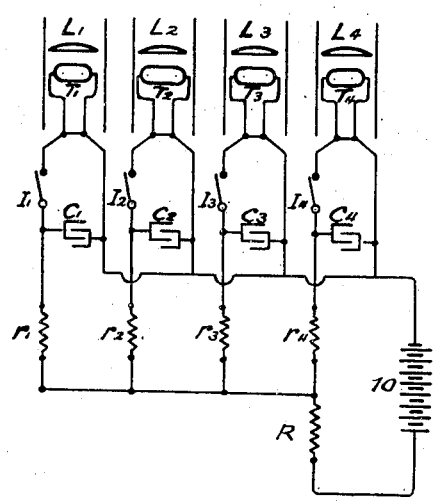

Figure 5 shows diagrammatically an arrangement that may be used for a signalling device with several tubes.

In Figure 1, T is a luminescence tube with two electrodes to which are connected the plates of a condenser C which in turn receives current from any independent source S. The capacity of the condenser C and the strength of the source of current S are brought into such a relation to each other that the plates of the condenser C will show only at the end of a suitable interval of time, a difference of tension between the plates of condenser C sufficient to enable a sudden discharge to be produced in the tube T. In that way, discharges in the tube T will take place at definite intervals of time and during said intervals the source of current S can charge the condenser S to the desired voltage.

If I is the value of the current at the source S at any moment and $t$ the units of time, Q the capacity of the condenser C, and E the voltage required to produce a sudden discharge in the tube T, and if $t_n$ and $t_{n+1}$ are the times of two successive discharges, that is to say between the two successive flashes of light of the tube T, then $$\int_{t_n}^{t_{n+1}} I \cdot dt = E \cdot Q$$

If $t_{n+1}$, $t_n$ and I are known, this formula will make it possible to determine Q as a function of E so that the desired interval of time between the discharges may be obtained.

By varying one of these values (preferably Q) it is possible to vary the interval of time between two consecutive discharges, and in that way to produce specially characterized signals.

It is known that the critical voltage of a tube becomes lower when it is surrounded by an outer chain which is connected to earth. It is sufficient therefore to regulate the voltage of the source of current S to a value which is somewhat below the energizing voltage of the insulated tube. A suitable device will produce the discharge by earthing the tube. This device avoids any arcing or dangerous sparking when switching.

Figure 2 shows a device which represents the combination of two systems of the kind illustrated in Figure 1. Its object is to amplify the flash. The tube T is fed in this case by two sources of current S, S1 with the interposition of two condensers C and C1. The first condenser C is connected for instance to electrodes K which are provided in the outer ends of the tube. The second condenser C1 is connected to the electrodes K1 which are arranged for instance between electrodes K. The system S, C, T is exactly the same as that of Figure 1. The condenser C1 should be a condenser of a relatively very high capacity and the source of current S should give current of sufficient strength so as to enable the condenser C1 to be brought to a suitable voltage between two successive discharges of the system S, C, T. This voltage or tension will not be sufficient to enable the discharge of the condenser C1 suddenly to break through the interval between the electrodes K1. When however the discharge of the condenser C takes place between the two electrodes K, the tube T will be ionized, so that the discharge of the condenser C1 will be able to take place between the electrodes K1. In view of the great capacity of the condenser C1, this discharge will produce a high tension and therefore the part of the tube in which it will become operative, will light up very strongly.

It will be seen that the condenser C1 has no effect whatever on the regulation of the rhythm of discharge. This regulation is effected exclusively by the system S, C, T, and in practice by the capacity of the condenser C. The condenser C1 will have no other effect than that of intensifying the lighting power of the discharge produced by the condenser C. Obviously the sources of power S and S1 need not be necessarily separate, and it is possible to use for instance two conductors of one and the same circuit, in which case the current is either passed through a single current rectifier or through a rectifier which is provided for each branch conductor. It is also clear that in place of a single tube T, several tubes of different colours may be used, each being connected to a device constructed according to the invention, these devices being so regulated relatively to one another that the current is successively conveyed into the various tubes, and that the sequence for obtaining a succession of coloured flashes will always be the same and will always take place in the same rhythm.

Figure 5 shows diagrammatically a construction of such a signalling installation with several tubes. An auxiliary circuit which is fed for instance from a battery, feeds a given number of tubes T1—T4 which are provided on the branches of the circuit. In the circuit which feeds these tubes, are connected (1) a resistance R1—R4; (2) a condenser C1—C4.

In a first construction, the resistances R1—R4 are regulated in such a manner that the the time of discharge of the various condensers is equal to the tension which corresponds to the discharge in the tubes. It is obvious that when the discharge periods of the various condensers are the same, the length of time of this common period is regulated by means of a common resistance R.

Once the device has been started, the flashing of the tube takes place in a given sequence and remains invariable. In order to effect the initial setting or regulation, switches may be arranged for instance at 11—14, which are all open and which are successively closed in order to start the device, whereupon the said switches remain closed as long as the device is working. At L1, L2, L3 etc. are indicated optical devices which are intended to project the light emitted by the tubes so as to make it visible at a great distance. The device may be set in such a manner that the lighting up of the various tubes will take place not in the same sequence, that is to say that the individual periods of lighting of the various systems (resistance, condenser, tube) will be different. In this case there will be obtained a row of lights which will give flashes of a sequence independent of each other.

Figure 3 shows a construction of the device according to Figure 2, in which rectified alternating current is used for the feeding. The rectifying of the current may be effected by means of any known system. An example is shown in Figure 3.

In this figure, two transformers T1, T2 alternately feed the circuits, as well as the filament and plate of two thermionic tubes or valves R1, R2, the whole feeding with rectified current the condenser C. In the same way, T3, T4 transformers play the same part for the valves R3, R4, the combination of which forms a current rectifier which feeds the condenser C1. For practical purposes, the four transformers will be fed from the same alternating current mains. Obviously this device may be modified and more particularly the condensers C and C1 may be connected directly to a direct current main, provided that the latter has sufficient voltage to produce a sudden discharge in the tube T.

The device hereinbefore described has numerous advantages over known devices, which will be briefly enumerated as follows:—

The absence of any mechanical device (switches or the like) gives a simple device which does not require any attention and in which no trouble can readily occur. It must be pointed out moreover that the energy released at the moment of the discharge is energy which accumulates during a time very long in comparison with the times during which it is released. It is therefore possible to feed powerful devices with relatively weak sources of current and therefore with less expensive leads and with a very low consumption of current.

For instance a flash light may be obtained by using as ray tubes very small tubes of a known kind manufactured for a tension of 110 volts. Some of these tubes are provided with a resistance arranged in the bottom part of the tube. By connecting such a tube in series in a circuit of a battery such as is used as the tension battery for telegraph installations, a flash light producing a distinctly visible flash about every second, may be fed for about four years, without touching the device.

The tube T which is illustrated in Figure 3, has a particular shape the object of which is to increase its efficiency. This device is shown in detail in Figure 4. It is known that when a tube traversed by a discharge has a narrow part, the greater will be the illuminating flash of light. It is therefore advantageous to arrange tubes which are as narrow as possible. It is known however that the tubes which are of a small volume, become hard very soon. This difficulty has been eliminated by forming the tubes in the form shown in the figure.

A very narrow part 1 connects one of the electrodes 2 to a plate like intermediate electrode 3. From the plate like electrode 3 to the outer electrode 4, the tube is also narrow at 5. The condenser C (of great strength and of relatively small voltage) is connected to the electrodes 2, 4, and the condenser C1 of high voltage and relatively small strength of current is connected to the electrodes 2, 3.

It will be seen at once that the discharge of the condenser C as well as that of the condenser C1 will pass through the narrow parts of the tube. In view of the intensity of the discharge of the condenser C1, the part 1 may be made of quartz. For the rest a stock of gas is provided at 6. This stock is not touched by the discharge, but is intended to increase the volume of the tube. To that end, the tube is constituted by two sections; one which is constituted by the part which comprises the electrode 2 and the tube 1, and the other which is constituted by the part which comprises the electrode 4, the tube 5 and the ball 6. The two parts are connected together at 7 by welding or by any suitable method. At 8 there is provided an opening which allows the gas in the ball 6 to spread into the narrow parts 5 and 1.

As described, the invention comprises a device which makes it possible to obtain a flashing light or an intermittently working light, in such a manner as to enable the intervals between the successive flashes, or the length of time of the flashes, to be regulated.

Although the invention employs a construction similar to that which is used for obtaining oscillations, it differs from the latter by the fact that there is inserted in the discharge circuit a member which is intended to lengthen the time of the said discharge and to damp the oscillation. The effect aimed at is entirely different. In known devices, the object aimed at is to get a current of short duration with strong oscillations, which would never be suitable for feeding tubes which are intended to produce flashes. On the contrary, the object of the invention is to obtain a succession of discharge currents with small oscillations or even of direct currents, the duration of which may be regulated in order to obtain a succession of illuminating flashes which are as powerful as possible.

I claim—

1. A flash producing device comprising a luminescent discharge tube, a closed circuit therefor, a condenser in said circuit connected in shunt with said tube, an impedance in series between the condenser and the tube and a source of current in said circuit, the capacity of the condenser being such with reference to the intensity of said current that the flashes take place at predetermined intervals of time.

2. A flash producing device comprising a luminescent discharge tube, a closed circuit therefor, a variable condenser in said circuit connected in shunt with said tube, an impedance in series between the condenser and the tube, a source of direct current in said circuit and means for varying the capacity of the condenser with reference to the intensity of current adapted to give a predetermined value to the time between the successive flashes.

3. A device for producing a succession of flashes at different points, comprising a closed circuit, a source of current in said circuit, a plurality of branch circuits in shunt relationship thereto, a luminescence discharge tube in each branch circuit, an impedance in the feed circuit, a condenser in parallel with each tube, an impedance in series with the condenser and tube in each branch circuit, the capacity of each condenser being such with reference to the intensity of the current in the feed circuit and to the resistance of the corresponding branch circuit that the corresponding tube flashes at predetermined intervals of time.

4. A device for producing a succession of flashes taking place at different points, comprising a feed circuit, a plurality of branch circuits in shunt relationship thereto, a discharge tube in each branch circuit, an adjustable resistance in the feed circuit, a condenser in parallel with each tube, a resistance and a circuit breaker in series with the tube and condenser in each branch circuit, the capacity of each condenser being such with reference to the resistance in the corresponding branch circuit resistance that all the tubes flash at the same periodicity.

5. A lighting tube comprising in combination, a bulb, a tubular passageway connected at one end with said bulb, a second tubular passageway in said bulb in line with the said first tubular passageway, a gap between the inner end of said second tubular passageway and the point of junction of the first tubular pasageway and the bulb, and three electrodes, the first at the outer end of the first tubular passageway, the second at the outer end of the second tubular passageway and the third being a tubular electrode located between the two tubular passageways and in line with the surface of said tubular passageways.

In testimony that I claim the foregoing as my invention, I have signed my name.

DANIEL PAUL ALBERT ANDRÉ KAYSER.